United States Patent
Israel et al.

(10) Patent No.: US 9,405,970 B2
(45) Date of Patent: Aug. 2, 2016

(54) SYSTEM AND METHOD FOR OBJECT RECOGNITION AND TRACKING IN A VIDEO STREAM

(75) Inventors: Nadav Israel, Alfei Menashe (IL); Itay Katz, Tel Aviv (IL); Dudi Cohen, Beer Sheva (IL); Amnon Shenfeld, Tel Aviv (IL)

(73) Assignee: eyeSight Mobile Technologies Ltd., Herzliya (IL)

( * ) Notice: Subject to any disclaimer, the term of this patent is extended or adjusted under 35 U.S.C. 154(b) by 200 days.

(21) Appl. No.: 13/147,472

(22) PCT Filed: Feb. 2, 2010

(86) PCT No.: PCT/IL2010/000092
§ 371 (c)(1),
(2), (4) Date: Aug. 2, 2011

(87) PCT Pub. No.: WO2010/086866
PCT Pub. Date: Aug. 5, 2010

(65) Prior Publication Data
US 2011/0291925 A1 Dec. 1, 2011

Related U.S. Application Data

(60) Provisional application No. 61/202,157, filed on Feb. 2, 2009.

(51) Int. Cl.
*G06K 9/00* (2006.01)
*G06F 3/01* (2006.01)
*G06K 9/32* (2006.01)
*G06T 7/20* (2006.01)

(52) U.S. Cl.
CPC ............ *G06K 9/00355* (2013.01); *G06F 3/017* (2013.01); *G06K 9/3241* (2013.01); *G06T 7/2006* (2013.01); *G06T 2207/10016* (2013.01)

(58) Field of Classification Search
CPC ........................................................ G06F 3/03
USPC .................................................. 345/156–173
See application file for complete search history.

(56) References Cited

U.S. PATENT DOCUMENTS 6,035,067 A * 3/2000 Ponticos ............... G06T 7/2053
382/226
2010/0066667 A1* 3/2010 MacDougall et al. ........ 345/156

FOREIGN PATENT DOCUMENTS

WO    WO 2008139399 A2 * 11/2008

OTHER PUBLICATIONS

Communication under Rule 71(3) EPC from European Patent Office (Intent to grant patent) re: Application No. 10 707 972.5-1906 for Applicant Eyesight Mobile Technologies Ltd., dated Sep. 12, 2014.

*Primary Examiner* — Grant Sitta
(74) *Attorney, Agent, or Firm* — Lowenstein Sandler LLP; Ariel Reinitz

(57) ABSTRACT

Provided is a system and method for object detection and tracking in a video stream. Frames of the video stream are divided into regions of interest and a probability that the region contains at least a portion of an object to be tracked is calculated for each region of interest. The regions of interest in each frame are then classified based on the calculated probabilities. A region of interest (RI) frame is then constructed for each video frame that reports the classification of regions of interest in the video frame. Two or more RI frames are then compared in order to determine a motion of the object. Also provided is a system executing the presently described method, as well as a device including the system. The device may be for example, a portable computer, a mobile telephone, or an entertainment device.

30 Claims, 7 Drawing Sheets

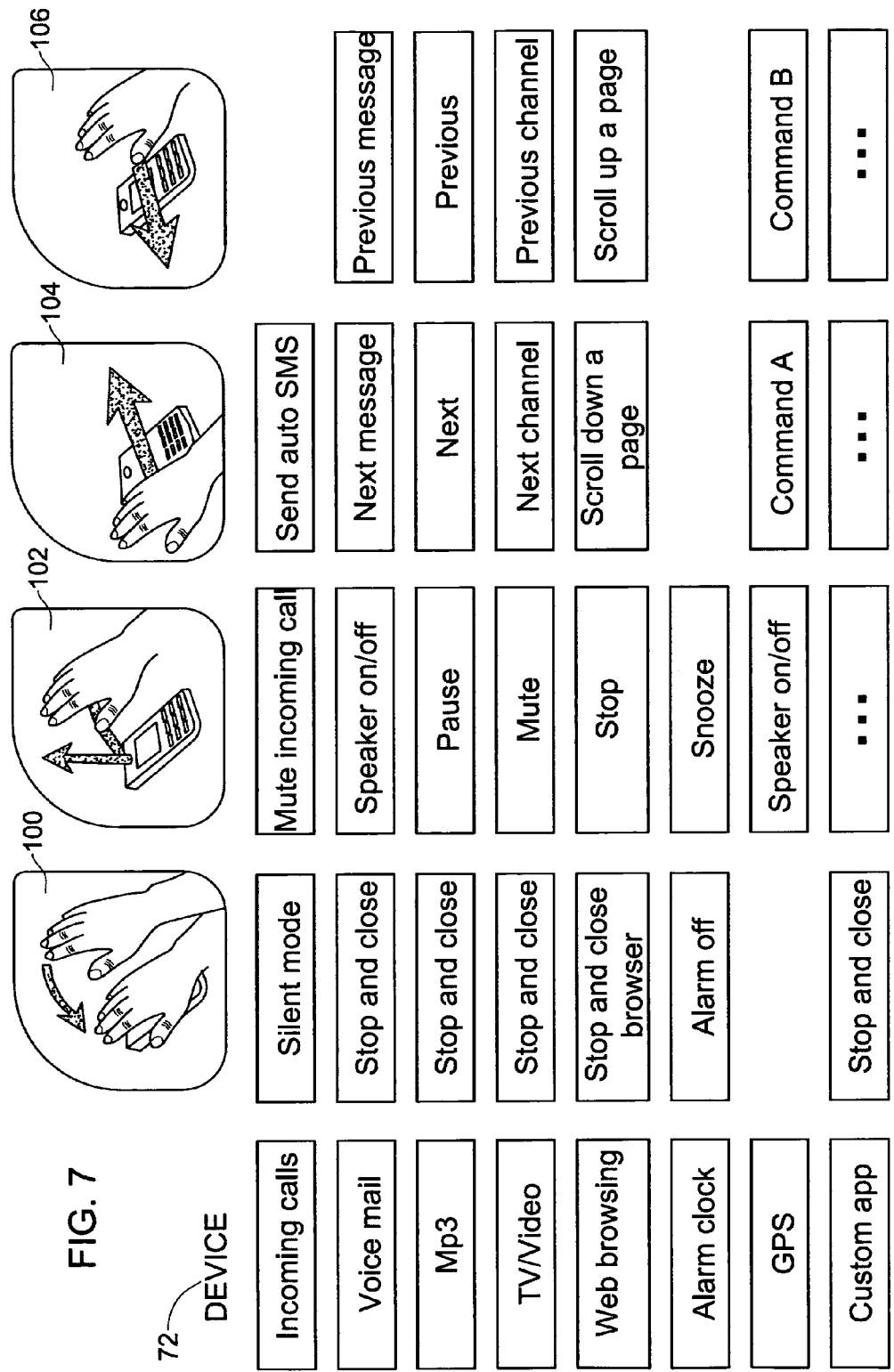

SYSTEM AND METHOD FOR OBJECT RECOGNITION AND TRACKING IN A VIDEO STREAM

This is a National Phase Application filed under 35 U.S.C. §371 as a national stage of PCT/IL2010/000092, filed Feb. 2, 2010, an application claiming the benefit under 35 U.S.C. §119(e) of U.S. Provisional Application No. 61/202,157,filed on Feb. 2, 2009, the content of each of which is hereby incorporated by reference in its entirety.

FIELD OF THE INVENTION

This invention relates to methods and systems for object detection and tracking, and to devices containing such systems.

BACKGROUND OF THE INVENTION

The following prior art publications are considered relevant for an understanding of the invention:

Digital Image Processing by Rafael C. Gonzalez, Richard E. Woods and Steven L. Eddins, Prentice Hall (2004), 10.4.2—Region Growing.

E. Deja, M. M. Deja, Dictionary of Distances, Elsevier (2006).

Mahalanobis, P C (1936). "On the generalised distance in statistics". Proceedings of the National Institute of Sciences of India 2 (1): 49-55).

Itakura F., "Line spectrum representation of linear predictive coefficients of speech signals," J. Acoust. Soc. Am., 57, 537(A), 1975.

James M. Abello, Panos M. Pardalos, and Mauricio G. C. Resende (editors) (2002). Handbook of Massive Data Sets. Springer.

E. R. Berlekamp, Algebraic Coding Theory, McGraw-Hill 1968.

Richard W. Hamming. Error Detecting and Error Correcting Codes, Bell System Technical Journal 26(2):147-160, 1950.

Dan Gusfield. Algorithms on strings, trees, and sequences: computer science and computational biology. Cambridge University Press, New York, N.Y., USA, 1997).

U.S. Pat. Nos. 5,767,842 and 6,650,318

Entering data into a data processing device is accomplished using a data input device such as a keyboard, mouse, or joystick. Although electronic devices are constantly being miniaturized, the size of the various associated data input devices cannot be substantially decreased since they must conform to the size of a user's hands. Methods for inputting data have therefore been devised in which the user's hands do not have to touch the device. U.S. Pat. Nos. 5,767,842 to Korth, and 6,650,318 to Amon for example, disclose an optical system in which a camera is used to monitor a user's hand and finger motions. A software application interprets these motions as operations on a physically non-existent computer keyboard or other input device. In these systems, the camera has a fixed position, so that the background of the images remains constant. This allows the software application to make use of information present in the constant background in order to detect the user's hands in each image. This system, therefore, cannot be used in a device that in use is moved because, in this case, the background of the images is not constant, so there is no reliable background information in the images. Devices that are moved in use include hand-held devices such as a personal digital assistant (PDA), a mobile telephone, a digital camera, and a mobile game machine.

SUMMARY OF THE INVENTION

In its first aspect, the present invention provides a system for object detection and tracking in a video stream. The system of the invention is based on two separate logical hierarchies. The first hierarchy partitions the video stream into regions of interest which act as standalone motion sensors in the environment, independently responsible for calculating the likeliness of the tracked object being present in the region. The second hierarchy monitors the behavior of the set of regions over time and, based on patterns of likeliness, calculates the position and motion parameters of the tracked object.

The system of the invention comprises a memory storing frames of a video stream to be analyzed by the system. A processor fetches frames of the video stream stored in the memory. An object detection module classifies regions of interest in each frame according to the probability that the region of interest contains at least a portion of a predetermined object to be tracked. As explained below, object detection by the object detection module does not involve edge detection of the objection in the frames. An object tracking module receives as its input the classified frames output by the object detection module and, by comparing consecutive classified frames, determines the motion of the object. The system of the invention may be used to input operating system (OS) commands to the device instead of, or in addition to, any input devices associated with the device such as a keyboard, mouse or joystick. The system of the invention my be used in any type of data processing device such as a personal computer (PC), a portable computer such as a PDA, a laptop or a palm plot, a mobile telephone, a radio or other entertainment device, a vehicle, a digital camera, a mobile game machine, a computerized medical device and a smart house product.

Depending on the application, the processor may optionally include a pattern to recognition module that identifies patterns of motion of the tracked object from among a predetermined set of object motions. The system may further comprise an OS command execution module that stores a look-up table that provides, for each of one or more of the predetermined motion patterns, an associated OS command. When one of the predetermined object motions is identified, the OS command associated with the motion is executed by the system.

In its second aspect, the invention provides a data processing device comprising the system of the invention. The data processing device may be, for example, a personal computer (PC), a portable computer such as a PDA, a laptop, or a mobile telephone, a radio or other entertainment device, a vehicle, a digital camera or a mobile game machine. The device of the invention has a video camera and processor configured to carry out object detection and object tracking, as explained above. The object to be detected and tracked may be for example a hand or finger of a user or a hand held stylus or other predefined or specific device.

The device of the invention comprises a memory that stores a look-up table that provides, for each recognized motion an associated OS command. When a motion pattern is detected by the pattern identification module, the OS command associated with the motion is looked up in the look-up and the OS command associated with the motion is then executed. The OS command may be, for example, activate functions such as Speaker On/Off, Next/Previous track in the MP3/IPTV, control map views in the GPS application and to switch on voicemail service, In accordance with this aspect of the invention, the frames of the video stream are partitioned into two or more regions of interest. For each region of interest, a statistical analysis of the pixels in the region of interest is performed. For example, the statistical analysis may comprise generating a histogram for each of one or more functions defined on the pixels of the region of interest. The function may be, for example, an intensity of any one of the colors red, green, or blue of the pixels, or any one of the hue, saturation or luminance of the pixels. The histograms may be histograms of a single variable or may be multivariable histograms, in which the frequency of n-tuples of pixel properties is tallied. The statistical analysis may also comprise calculating values of statistical parameters such as an average, mode, standard deviation, or variance of any one or more of the histograms. The results of the statistical analysis of region of interest are used to classify the region according to the probability that the region contains at least a portion of the object being detected. For each frame analyzed, a "region of interest (RI) frame" is generated which is a representation of the classifications of the regions of interest of the frame.

One or more pattern detection modules are used to detect specific motion patterns of the object from the RI frames. Each pattern detection module outputs a probability that the specific motion pattern detected by the pattern detection module occurred during the time window. The outputs of the one or more pattern recognition modules are input to a motion recognition module that determines a motion pattern most likely to have occurred. The determination of the motion detection module is based upon the probabilities input from the pattern recognition modules and may also take into account an external input, for example, an input from the operating system or the application being run.

Thus, in its first aspect, the invention provides a system for object detection and tracking in a video stream, comprising:
- (a) a processor comprising an object detection module and an object tracking module;
- wherein the object detection module is configured to:
  - (i) calculate, for each of one or more regions of interest in each of two or more frames in the video stream, a probability that the region of interest contains at least a portion of an object to be tracked; and
  - (ii) classify the regions of interest in each of the two or more frames according to the calculated probabilities and generate a region of interest (RI) frame for each video frame, the RI frame reporting the classification of regions of interest; and wherein the object tracking module is configured to:
  - (i) compare two RI frames generated by the object detection module and determine a motion of the object.

The object tracking module may comprise one or more pattern detection modules, each pattern detection module being configured to calculate a probability that a specific pattern of motion of the tracked object during a time window occurred during the time window. The object tracking module may further comprise a motion recognition module determining a motion pattern most likely to have occurred based upon the probabilities generated by the one or more pattern detection modules. The determination of the motion recognition module may involve taking into account an external signal.

The system of the invention may further comprise an operating system (OS) command execution module configured to execute an OS command associated with an identified pattern of motion.

In its second aspect, the invention provides a method for object detection and tracking in a video stream, comprising:
- (i) calculating, for each of one or more regions of interest in each of two or more frames in the video stream, a probability that the region of interest contains at least a portion of an object to be tracked;
- (ii) classifying the regions of interest in each of the two or more frames according to the calculated probability and generating a region of interest (RI) frame for each video frame, the RI frame reporting the classification of regions of interest; and
- (i) comparing two or more RI frames generated by the object detection module and determine a motion of the object.

The probability that a region of interest contains at least a portion of the object to be tracked may be obtained in a method comprising:
- (a) for each of one or more regions of interest in each frame in the video stream, calculating a statistical analysis of the pixels in the region of interest;
- (b) calculating a discrete classification of the region of interest in a calculation involving the statistical analysis of the region of interest in one or more previous frames of the video stream.

The statistical analysis may comprise generating a histogram for each of one or more functions defined on pixels of the region of interest. One or more of the functions may be selected from the group comprising:
- (a) an intensity of any one of the colors red, green, or blue of the pixels; and
- (b) any one of a hue, saturation or luminance of the pixels.

The method of the invention may further comprise calculating values of statistical parameters of one or more of the functions. One or more of the statistical parameters may be selected from the group comprising:
- (a) an average;
- (b) a mode;
- (c) a standard deviation; and
- (d) a variance.

The step of comparing two or more RI frames may comprise:
- (a) for each frame, and for each of the classified regions of interest in the frame, comparing the classification of the region of interest with the classification of the region of interest in a plurality of frames obtained in a time window containing the frame;
- (b) determining, on the basis of the comparison, whether or not the selected region of interest contains the object to be tracked;
- (c) reclassifying, on the basis of this determination, the region of interest, according to whether or not the region of interest contains the object to be tracked; and
- (d) calculating one or more tracking parameters of the object's motion based upon changes in the states of two or more of the regions during a time window.

The tracking parameters may be selected from the group comprising:
- (a) direction of movement of the object;
- (b) a speed of movement of the object;
- (c) an acceleration of the object;
- (d) a width of the object in pixels; and
- (e) a height of the object in pixels; and
- (f) location of the object in the frame In another of its aspects, the invention provides a data processing device comprising a system of the invention. The data processing device may be selected from the group comprising:

(a) a personal computer (PC);
(b) a portable computer such as a PDA or a laptop.
(c) a mobile telephone;
(d) a radio;
(e) an entertainment device;
(f) Smart Home;
(g) a vehicle;
(h) a digital camera
(i) kitchen appliance;
(j) an media player or media system,
(k) location based devices; and
(l) a mobile game machine.
(m) a pico projector or an embedded projector
(n) medical display device.
(o) an in-car/in-air Infotainment system.

The device of the invention may further comprise one or both of a video camera and a display screen.

One or more of the patterns of motion of the tracked object may be selected from the group comprising:
  (a) a width of the object in pixels increased during the time window;
  (b) the width of the object in pixels decreased during the time window;
  (c) the object moved closer to the camera;
  (d) the object moved away from the camera;
  (e) the object moved in a predetermined path;
  (f) the object rotated;
  (g) the object was stationary;
  (h) the object performed any type of motion;
  (i) the object performed a flicking motion;
  (j) the object accelerated;
  (k) the object decelerated; and
  the object moved and then stopped.

The processor may further comprise an operating system (OS) command execution module configured to execute an OS command of the device associated with an identified pattern of motion. The OS commands may be selected from the group comprising:
  (a) depressing a virtual key displayed on a display screen of the device;
  (b) moving a curser appearing on a display screen of the device to a new location on the screen;
  (c) rotating a selection carousel;
  (d) switching between desktops;
  (e) running on the central processor unit a predetermined software application;
  (f) turning off an application;
  (g) turning the speakers on or off;
  (h) turning volume up/down;
  (i) skipping to the next or previous track in a media player or between IPTV channels;
  (j) controlling a GPS application;
  (k) switching on voicemail service;
  (l) navigating in photo/music album gallery;
  (m) scrolling web-pages, emails, documents or maps;
  (n) controlling actions in mobile games; and
  (o) controlling interactive video or animated content.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 4a shows three frames in a video stream and FIG. 4b shows region of interest (RI) frames obtained from the frames of FIG. 4a.

FIG. 7 shows examples of motion patterns and their use in executing OS commands in various types of devices; and

DETAILED DESCRIPTION OF EMBODIMENTS

Figure 1:
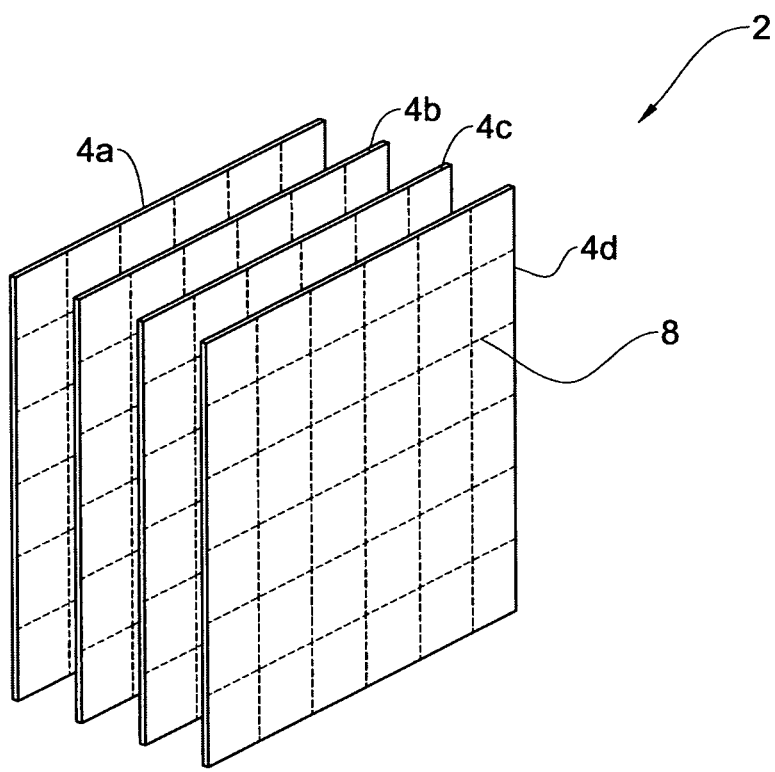
FIG. 1 shows schematically a video stream comprising a plurality of frames partitioned into regions of interest.

FIG. 1 shows schematically a video sequence 2 comprising a sequence of video frames 4. Four frames, 4a, 4b, 4c, and 4d are shown in FIG. 1. This is by way of example only, and the video sequence 2 can contain any number of video frames that is at least 2. Each frame consists of a plurality of pixels which are partitioned into regions of interest 6, the boundaries of which are indicated in FIG. 1 by broken lines 8. The frames 4 are shown in FIG. 1 divided into 36 regions of interest 6 (six rows of six regions of interest). This is by way of example only, and the frames 4 can be divided into any number of regions of interest that is at least two. The regions of interest may have any shape, and may overlap.

Figure 2:
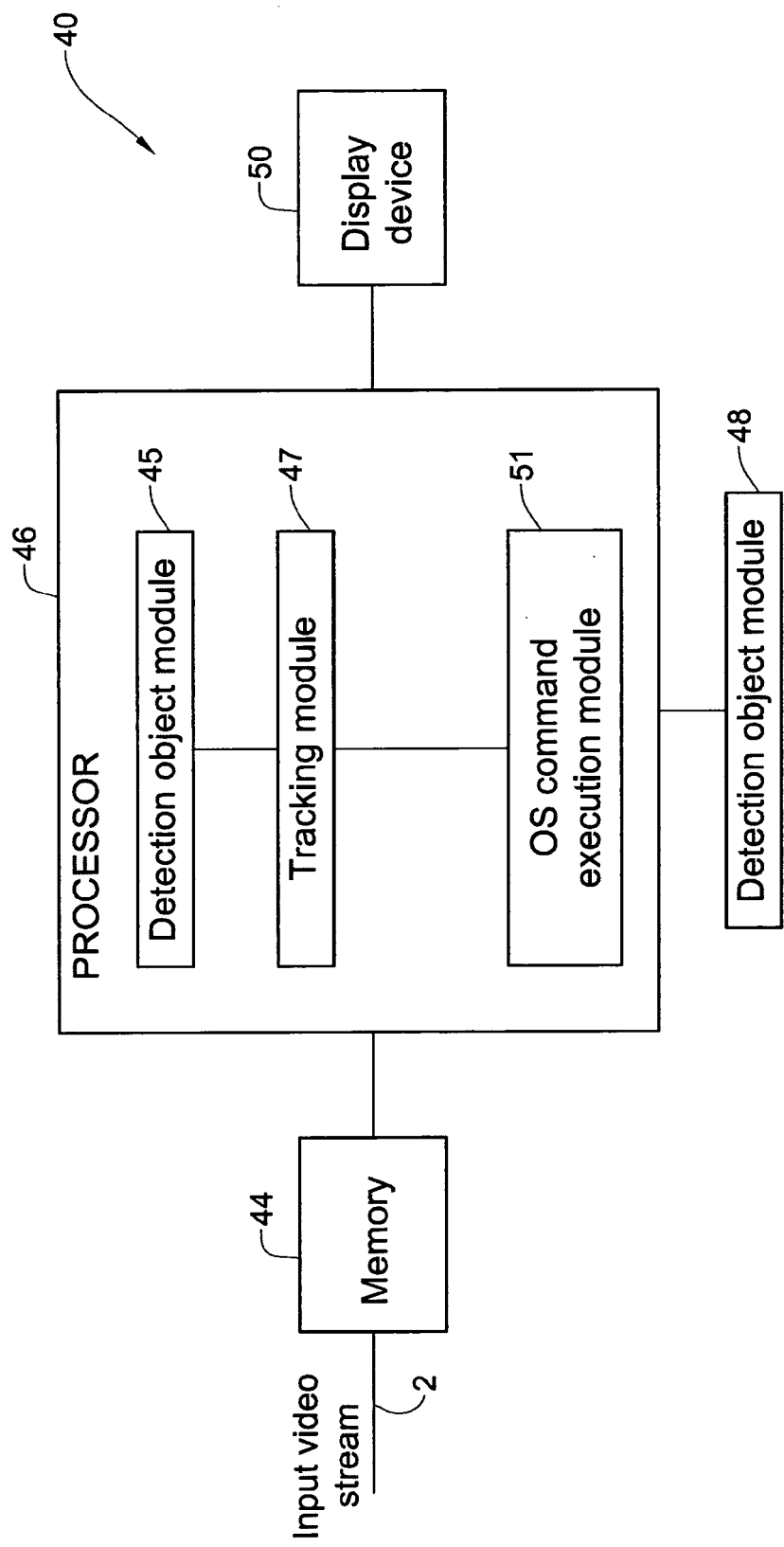
FIG. 2 shows a system for object detection and tracking in accordance with one embodiment of the invention.

FIG. 2 shows a system 40 for object detection and tracking in a video stream, such as the video stream 2, in accordance with one embodiment of the invention. The video stream 2 is input into a memory 44. The memory 44 is accessible by a processor 46 which fetches the frames 6 of the video stream 2 stored in the memory 44. The processor 46 comprises an object detection module 45 which analyzes the video stream 2, and an object tracking module 47 which analyzes the output of the object detection module 45, as explained below. The object detection module 45 classifies regions of interest in each frame according to the probability that the region of interest contains at least a portion of the object to be tracked. The object tracking module 47 receives as its input the classified frames output by the object detection module 45, and, by comparing the classifications of the regions of interest in consecutive frames, determines the motion of the object.

The system 40 may further comprise an OS command execution module 51. In this case, the memory 44 stores a look-up table that provides, for each of one or more of the predetermined motion patterns, an associated OS command. When one of the predetermined object motions is identified, the OS command associated with the motion is executed.

A user input device 48 may be used to input any relevant data into the system 40, such as an identification of the video stream 2, or the parameters to be analyzed by the processor 46, as explained below. The video stream 2, as well as the results of the processing can be displayed on a display device 50, such as a CRT screen, LCD, or printer.

Figure 3:
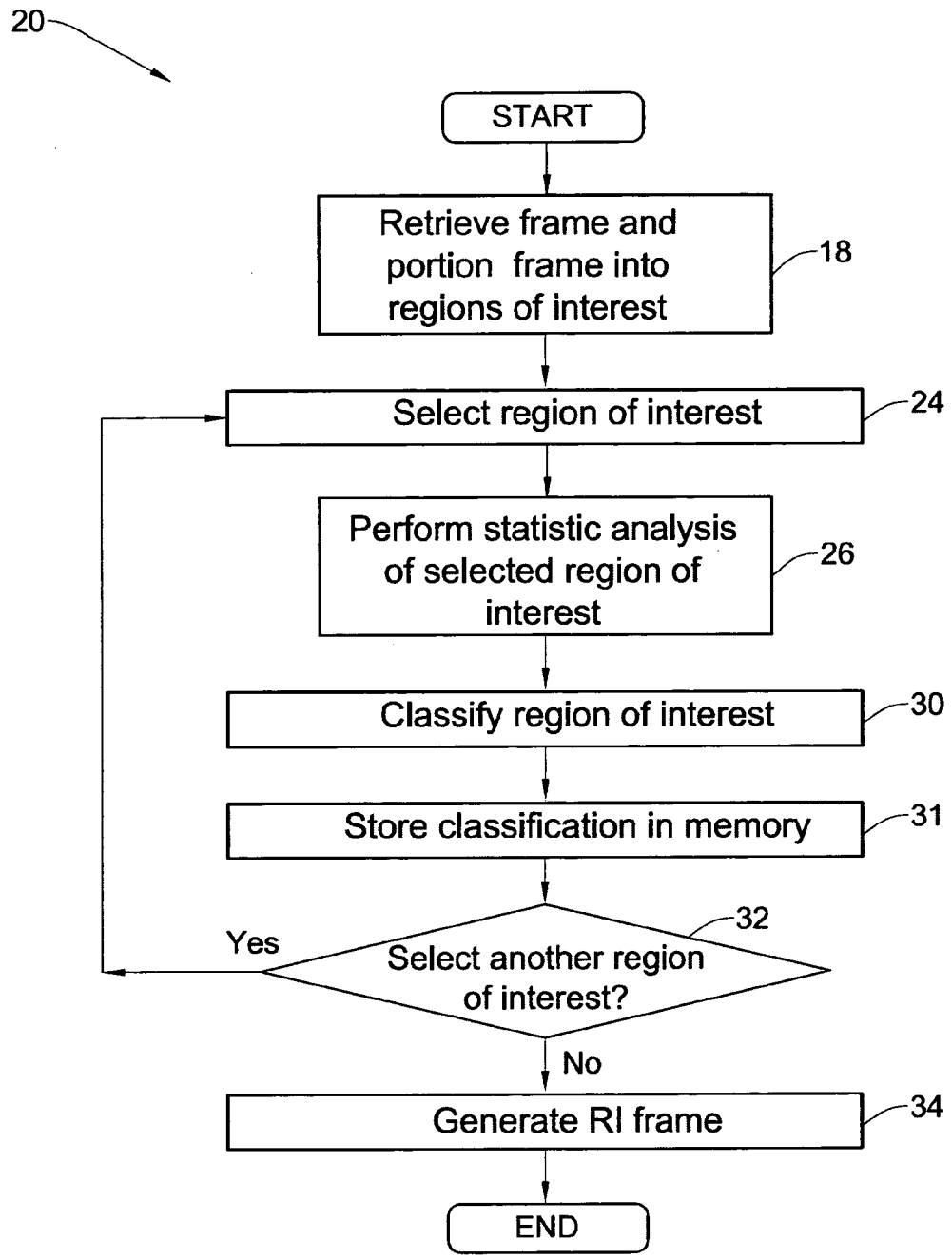
FIG. 3 shows a method of object detection in accordance with one embodiment of the invention.

FIG. 3 shows a process 20 for object detection in a frame of the video stream 2 that is carried out by the object detection module 45 of the processor 46 in accordance with one embodiment of the invention. The process begins with step 18 in which the frame is retrieved from the memory 44 and is partitioned into two or more regions of interest 6. The regions of interests can either be created dynamically by using any object segmentation technique known in the art, such as seeded region growing as disclosed in Rafael C. Gonzalez, Richard E. Woods and Steven L. Eddins, Digital Image Processing, Prentice Hall (2004), Section 10.4.2 (Region Growing). Alternatively, the regions of interest may be statically defined as a group of regions such by a fixed 6 by 6 matrix segmenting the frame into 36 regions. Then, in step 24 a region of interest 6 is selected in the frame, and a statistical analysis of the pixels in the region of interest is performed in step 26. For example, the statistical analysis may comprise generating a histogram 10 for each of one or more functions defined on the pixels of the region. The function may be, for example, an intensity of any one of the colors red, green, or blue of the pixels, or any one of the hue, saturation or luminance of the pixels. The histograms may be histograms of a single variable or may be multivariable histograms, in which the frequency of n-tuples of pixel properties is tallied. The statistical analysis may also comprise calculating values of statistical parameters such as an average, mode, standard deviation, or variance of any one or more of the histograms. The results of the statistical analysis are stored in the memory 44.

In step 30, the region of interest that was just analyzed is classified. The classification of a region of interest is a discrete function that describes the probability of the presence of the tracked object in the region of interest. The classification of the region of interest is determined in a method involving the statistical analysis of the region of interest in the current frame and the statistical analysis of the region of interest in one or more previous frames of the video stream. In one embodiment, a distance function is applied to calculate the similarity of various parameters and statistical features in the selected region to parameters and statistical features presenting a tracked object passing in the region. Region and object parameters may include for example the existence of different shapes and contours and their frequencies, while statistical features may include for example the histograms of hue, luminance and saturation and the color pattern. The combined distance result is compared to the results of the region of interest in previous frames. For example, a distance in hue parameters may indicate that an object of the same color as the tracked object has entered the region. This may cause the region to be classified with higher probability of containing the tracked object. The distance function may be, for example, a Euclidean Distance (E. Deja, M. M. Deja, Dictionary of Distances, Elsevier (2006)), a Mahalanobis Distance (Mahalanobis, P C (1936). "On the generalised distance in statistics". Proceedings of the National Institute of Sciences of India 2 (1): 49-55) a Itakura saito Distance (Itakura F., "Line spectrum representation of linear predictive coefficients of speech signals," J. Acoust. Soc. Am., 57, 537(A), 1975), a Chebyshev Distance (James M. Abello, Panos M. Pardalos, and Mauricio G. C. Resende (editors) (2002). Handbook of Massive Data Sets. Springer.), a Lee Distance (E. R. Berlekamp, Algebraic Coding Theory, McGraw-Hill 1968), a Hamming Distance (Richard W. Hamming. Error Detecting and Error Correcting Codes, Bell System Technical Journal 26(2):147-160, 1950), or a Levenshtein Distance (Dan Gusfield. Algorithms on strings, trees, and sequences: computer science and computational biology. Cambridge University Press, New York, N.Y., USA, 1997). The classification of the selected region of interest is stored in the memory 44 (step 31).

Figure 4A:
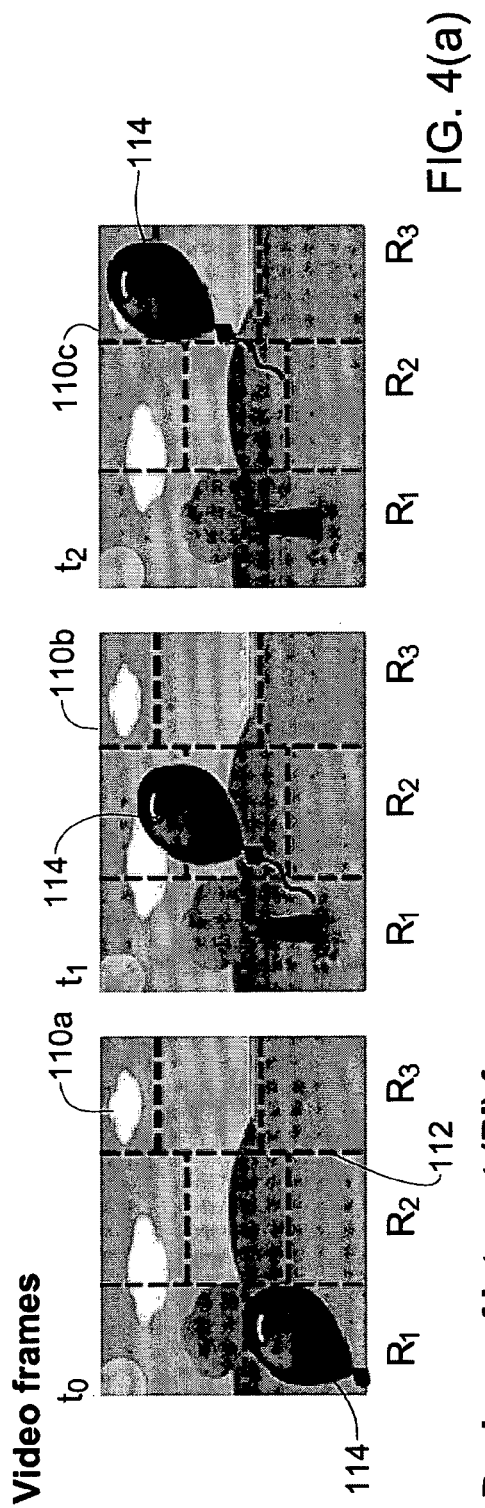
Figure 4B:
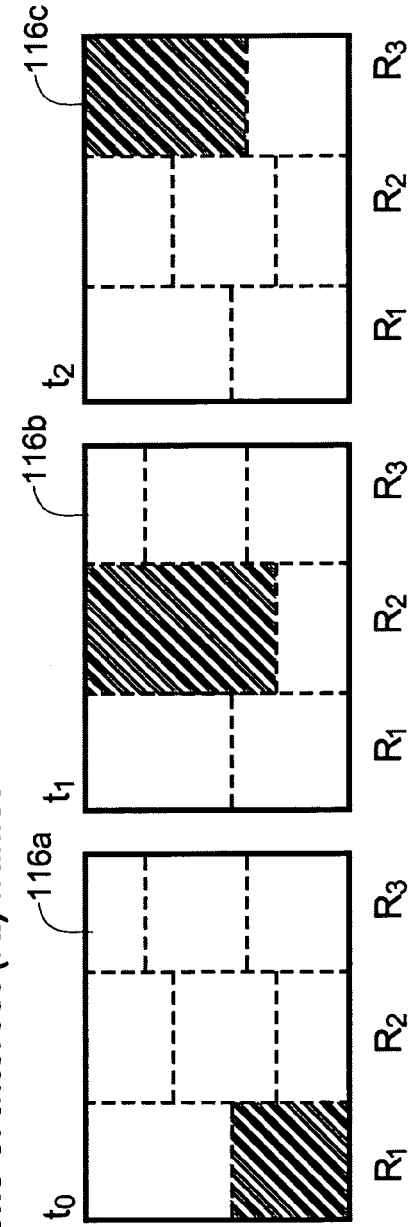

In step 32 it is determined whether another region of interest of the frame is to be analyzed by the detection module 45. If yes, then the process returns to step 24 with the selection of another region of interest in the current frame. Otherwise, the process continues with step 34 where a "region of interest (RI) frame" is generated for the video frame, and the process terminates. The RI frame of the input video frame is a representation of the classifications of the regions of interest of the frame. FIG. 4a shows three frames 110a, b, and c of a video stream obtained at three different times (times $t_0$, $t_1$, and $t_2$, respectively). In this example, the frames are arbitrarily divided into static regions of interest indicated by broken lines 112. Alternatively, a method for dynamic partition of the frame into regions of interest can be used. For example, growing a set of preset seed regions into larger areas which maintain statistical homogeneity. For example, a seed region located in the sky area of FIG. 4 will grow until the region meets the ground where the hue histogram and edge frequency change significantly. This partitioning process may be assisted by pre-knowledge of the axis of the expected motion to be tracked or a statistical analysis of several frames which determines high variance regions which should be omitted from the original interest group. An object 114 to be tracked has moved in the frames during the time interval from $t_0$ to $t_2$. FIG. 4b shows region of interest frames 116a, 116b, and 116c, corresponding to the video frames 110a, 110b, and 110c, respectively. In the example of FIG. 4, each region of interest was classified into one of two classifications depending on whether at least a portion of the object 114 is located in the region of interest (indicated in FIG. 4b by cross hatching of the region of interest), or whether the region of interest does not contain at least a portion of the object 114 (unhatched regions of interest in FIG. 4b). Thus, in the RI frame 116a obtained at time $t_0$, a region 117a, located on the right side of the frame has been classified as containing the object 114. This classification can be obtained by calculating the similarity rating of the region and the tracked object, for example by measuring the Euclidian Distance between the hue histogram of the tracked object and the histogram of the selected region. Using the same method, in the intermediate frame 116b, two regions 117b and 117c have been classified as containing the object 114 and in the later frame 116c, two regions 117d and 117e have been classified as containing the object 114.

The tracking module 47 receives as its input the RI frames generated by the detection module 45 during a time window of the video stream. The tracking module 47 may operate simultaneously with the detection module 45, receiving classified frames as they are generated by the detection module 45. Alternatively, the tracking module 47 may operate sequentially with the detection module 45, receiving the classified frames only after all of the frames of the video stream have been classified.

Figure 5:
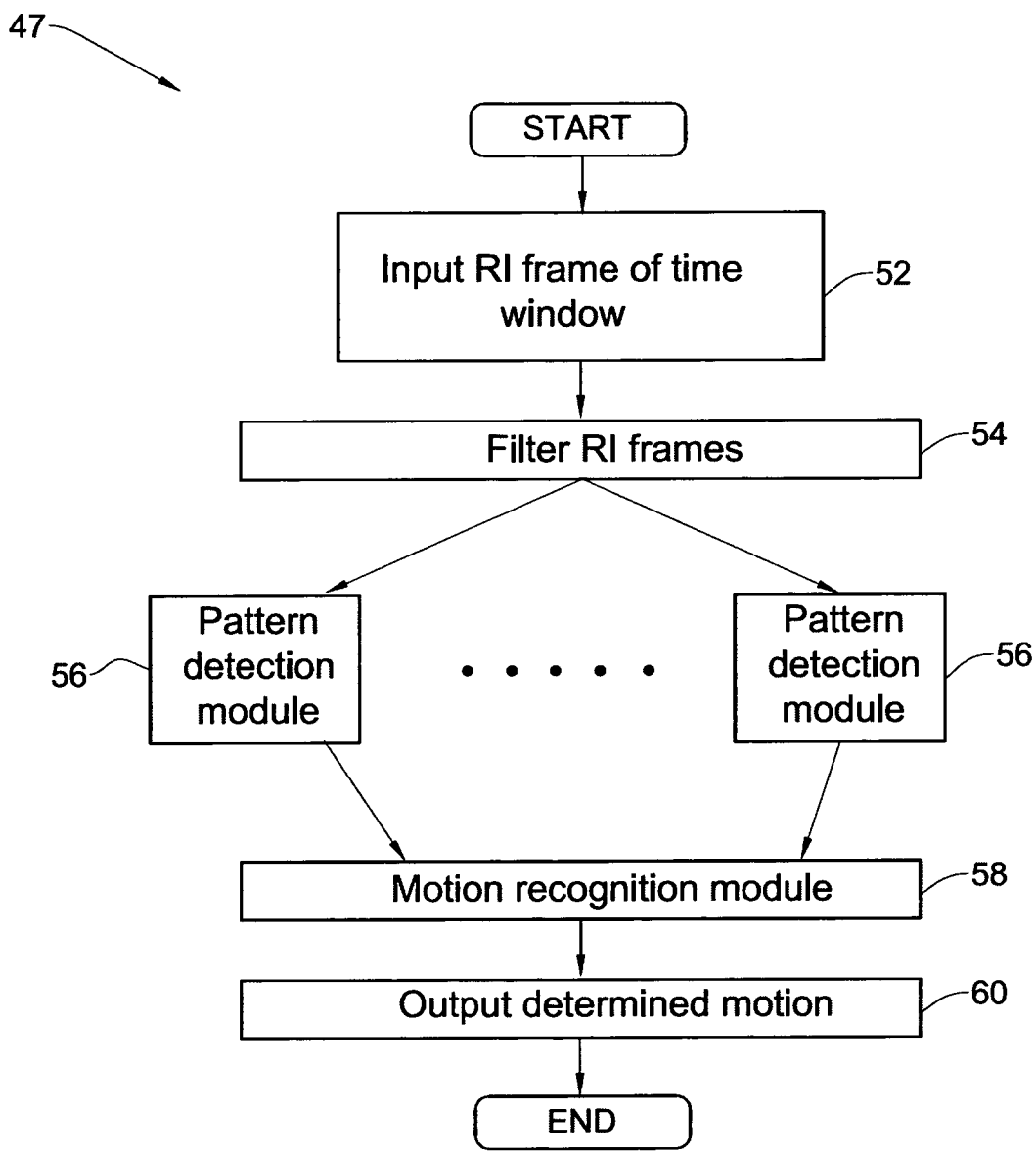
FIG. 5 shows a method for object tracking in accordance with one embodiment of the invention.

FIG. 5 shows an object tracking process carried out by the object tracking module 47 in accordance with one embodiment of the invention. In step 52 the RI frames of the time window are input to the tracking module 47, and in step 54, the RI frames are filtered for removal of random noise. The filtered RI frames are then input to one or more independent pattern detecting modules 56. Each pattern detection module 56 is configured to detect a specific motion pattern of the object from the filtered RI frames, and outputs a probability that the specific motion pattern of the pattern detection module occurred during the time window. Each pattern detection module 56 applies pattern recognition tests to some or all of the input RI frames. For example, referring again to FIG. 4b, the pattern detection module 56 would detect a motion of the object from the left side of the frame to the right side of the frame. The output of the one or more pattern recognition modules 56 is input to a motion recognition module 58. The motion recognition module 58 determines a motion pattern most likely to have occurred during the time window. The determination of the motion detection module 58 is based upon the probabilities input from one or more pattern recognition modules 56 and may also take into account an external input, for example, an input from the operating system or the application being run. The motion determination of the motion recognition module 58 is then output (step 60) and the process terminates.

Figure 6:
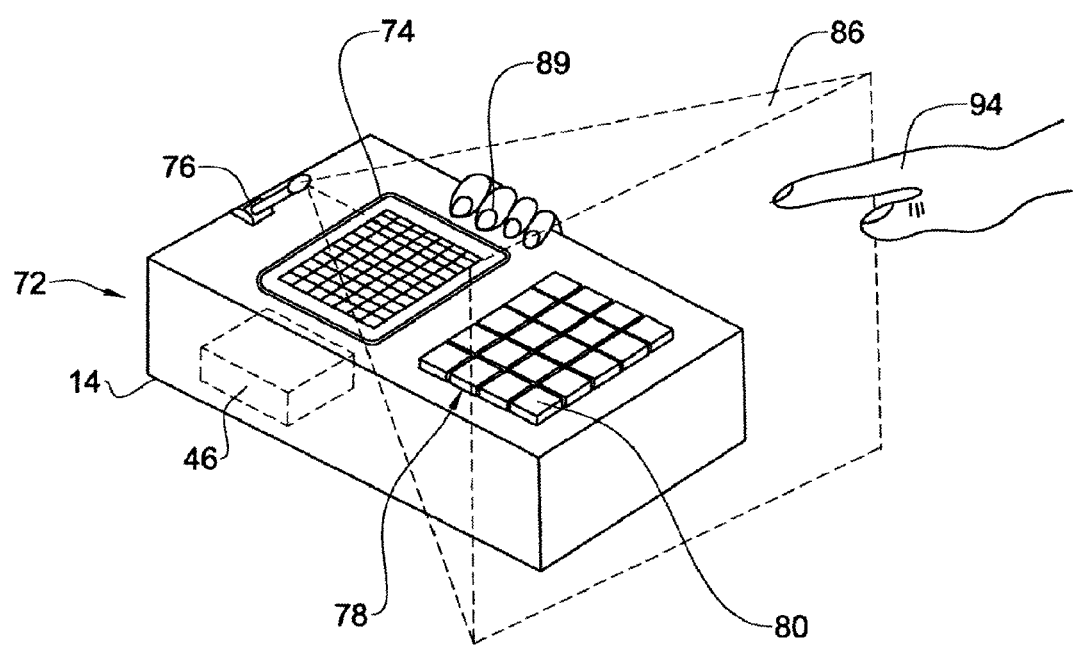
FIG. 6 shows a data processing device incorporating the system of the invention for object detection and tracking.

FIG. 6 shows a data processing device 72 comprising the system 40, in accordance with one embodiment of this aspect of the invention. The data processing device 72 may be, for example, a personal computer (PC), a portable computer such as a PDA, a laptop or a palm plot, or a mobile telephone, a radio or other entertainment device, a vehicle, a digital camera or a mobile game machine. The device 72 has a video camera 76. The device 72 may also be provided with a display screen 74 and various data input devices such as a keypad 78 having a plurality of keys 80 for inputting data into the data input device 72.

The camera 76 views a conical or pyramidal volume of space 86 indicated by broken lines. The camera 76 may have a fixed position on the device 72, in which case the viewing space 86 is fixed relative to the device 72, or may be positionable on the device 72, in which case the viewing space 86 is selectable relative to the device 72. Images captured by the camera 76 are digitized by the camera 76 and input to the processor 46 (see also FIG. 2). The object detection module 45 of the processor 46 detects a predetermined object 94 in frames obtained by the camera 76, as explained above. The object 94 may be for example a finger or entire hand of a user, in various positions, such as an open hand, closed hand or back hand. The user may use his other hand 89 to hold the device 2 in use, if the device 2 is a hand-held device. The hand 89 may also be used to activate real input devices associated with the device 72, such as activating keys 80 on the keypad 78.

The memory 44 stores a look-up table that provides, for each test an associated OS command. When a motion pattern is detected by the pattern identification module 49, the OS command associated with the motion is looked up in the look-up table stored in the memory 44, and then the OS command associated with the motion is executed by the OS execution module 51. The OS command may be, for example, depressing a virtual key displayed on the display screen, moving a curser appearing on the display screen to a new location on the screen, running on the processor 46 a software application stored in the memory 44, or turning off the device 72. The device may provide an indication that the OS command was executed. For example, an OS command equivalent to depressing a key on the virtual keyboard may be indicated by briefly showing the key depressed on a virtual keyboard on the screen 4, or by briefly changing the appearance of the key. Other possibilities for indicating that the OS command was executed include briefly enlarging or otherwise changing the appearance of a depressed key or of the cursor on the screen 4, displaying an icon on the screen 4, producing a sound, and vibrating the device.

FIG. 7 shows examples of motion patterns that may be recognized by the pattern detection modules 56, and how the motion patterns may be used to execute an OS command, depending on the type of device 72. Motion 100 consists of moving a hand towards the device 72. Motion 102 consists of moving a hand toward the device 72 and then moving the hand away from the device. Motion 104 consists of moving a hand from left to right over the device, and motion 106 consists of moving a hand from right to left over the device.

The invention claimed is:

1. A system comprising:
 a processor configured to:
   (i) after a partitioning of a plurality of video frames in a video stream into a plurality of regions of interest, perform, for each region of interest, an analysis of the pixels in the region of interest;
   (ii) classify each of the regions of interest in each of the plurality of video frames based on the analysis and generate, for each video frame, a region of interest (RI) frame that comprises one or more classifications of one or more of the regions of interest in the video frame, wherein a classification of a region of interest is a function that describes the probability of a presence of a tracked object in the region of interest; and
   (iii) compare one or more classifications of regions of interest associated with one of the plurality of video frames with one or more classifications of regions of interest associated with one or more other video frames of the plurality of video frames to determine a motion of the tracked object, wherein both the one of the plurality of video frames and the one or more other video frames of the plurality of video frames correspond to a time window of the video stream.

2. The system of claim 1, wherein the processor is further configured to calculate a probability that a specific pattern of motion of the tracked object occurred during a time window.

3. The system of claim 2, wherein the processor is further configured to determine that a motion pattern is most likely to have occurred based on the probability that the specific pattern of motion of the tracked object occurred during the time window.

4. The system of claim 3, wherein a determination that the motion pattern is most likely to have occurred takes into account an external signal.

5. The system of claim 1, wherein the processor is further configured to execute an operating system (OS) command associated with an identified pattern of motion.

6. The system of claim 1, wherein the analysis of the pixels in the region of interest comprises a statistical analysis of the pixels in the region of interest, and wherein to classify each of the regions of interest, the processor is further configured to calculate a discrete classification of the region of interest in a calculation involving statistical analysis of the region of interest in one or more previous video frames in the video stream.

7. The system of claim 6, wherein the statistical analysis comprises generating a histogram for each of one or more functions defined on pixels of the region of interest.

8. The system of claim 7, wherein the one or more of the functions comprise at least one of:
 (a) an intensity of any one of the colors red, green, or blue of the pixels; or
 (b) any one of a hue, saturation or luminance of the pixels.

9. The system of claim 7, wherein the processor is further configured to calculate values of statistical parameters of the one or more of the functions.

10. The system of claim 9, wherein one or more of the statistical parameters comprise at least one of:
 (a) an average,
 (b) a mode,
 (c) a standard deviation, or
 (d) a variance.

11. The system of claim 7, wherein the statistical analysis further comprises calculating a distance between one or more generated histograms and a histogram indicative of the presence of the tracked object.

12. The system of claim 5, wherein to compare one or more classifications of regions of interest to determine a motion of the tracked object, the processing device is further configured to:
- reclassify a region of interest, according to whether or not the region of interest contains the tracked object; and
- calculate one or more tracking parameters of the motion of the tracked object based on changes in two or more of the regions of interest during a time window.

13. The system of claim 12, wherein the tracking parameters comprise at least one of:
(a) direction of movement of the tracked object,
(b) a speed of movement of the tracked object,
(c) an acceleration of the tracked object,
(d) a width of the tracked object,
(e) a height of the tracked object, or
(f) location of the tracked object within the video frame.

14. A method comprising:
(i) after a partitioning, by a processing device, of a plurality of video frames in a video stream into a plurality of regions of interest, the plurality of video frames being stored in a memory, performing, by the processing device, for each region of interest, an analysis of the pixels in the region of interest;
(ii) classifying, by the processing device, each of the regions of interest in each of the plurality of video frames based on the analysis and generating, by the processing device for each video frame, a region of interest (RI) frame that comprises one or more classifications of one or more of the regions of interest in the video frame, wherein a classification of a region of interest is a function that describes the probability of a presence of a tracked object in the region of interest; and
(iii) comparing, by the processing device, one or more classifications of regions of interest associated with one of the plurality of video frames with one or more classifications of regions of interest associated with one or more other video frames of the plurality of video frames to determine a motion of the tracked object, wherein both the one of the plurality of video frames and the one or more other video frames of the plurality of video frames correspond to a time window of the video stream.

15. The method of claim 14, wherein the analysis of the pixels in the region of interest comprises a statistical analysis of the pixels in the region of interest; and
wherein classifying each of the regions of interest, comprises calculating a discrete classification of the region of interest in a calculation involving the statistical analysis of the region of interest in one or more previous video frames in the video stream.

16. The method of claim 15, wherein the statistical analysis comprises generating a histogram for each of one or more functions defined on pixels of the region of interest.

17. The method of claim 16, wherein the one or more of the functions comprise at least one of:
(a) an intensity of any one of the colors red, green, or blue of the pixels, or
(b) any one of a hue, saturation or luminance of the pixels.

18. The method of claim 16, further comprising calculating values of statistical parameters of the one or more of the functions.

19. The method of claim 18, wherein one or more of the statistical parameters comprise at least one of:
(a) an average,
(b) a mode,
(c) a standard deviation, or
(d) a variance.

20. The method of claim 16, wherein the statistical analysis further comprises calculating a distance between one or more generated histograms and a histogram indicative of the presence of the tracked object.

21. The method of claim 14, wherein comparing one or more classifications of regions of interest to determine a motion of the tracked object comprises:
- reclassifying a region of interest according to whether or not the region of interest contains the tracked object; and
- calculating one or more tracking parameters of the motion of the tracked object based on changes in two or more of the regions of interest during a time window.

22. The method of claim 21, wherein the tracking parameters comprise at least one of:
(a) direction of movement of the tracked object,
(b) a speed of movement of the tracked object,
(c) an acceleration of the tracked object,
(d) a width of the tracked object,
(e) a height of the tracked object, or
(f) location of the tracked object within the video frame.

23. A data processing device comprising the system of claim 1.

24. The data processing device of claim 23, comprising at least one of:
(a) a personal computer (PC),
(b) a portable computer,
(c) a mobile telephone,
(d) a radio,
(e) an entertainment device,
(f) a smart home,
(g) a vehicle,
(h) a digital camera,
(i) a kitchen appliance,
(j) a media player or media system,
(k) a location based device,
(l) a mobile game machine,
(m) a Pico projector or embedded projector,
(n) a medical display device, or
(o) an in-car/in-air infotainment system.

25. The device of claim 23, further comprising at least one of a video camera or a display screen.

26. The device of claim 23, wherein the motion of the tracked object comprises a determination of at least one of:
(a) a width of the tracked object increased during the time window,
(b) the width of the tracked object decreased during the time window,
(c) the tracked object moved closer to a camera,
(d) the tracked object moved away from the camera,
(e) the tracked object moved in a predetermined path,
(f) the tracked object rotated,
(g) the tracked object was stationary,
(h) the tracked object performed any type of motion,
(i) the tracked object performed a flicking motion,
(j) the tracked object accelerated,
(k) the tracked object decelerated, or
(l) the tracked object moved and then stopped.

27. The device of claim 23, wherein the processor is further configured to execute an OS command of the device associated with an identified pattern of motion.

28. The device of claim 27, wherein one or more of the OS commands comprise at least one of:
(a) depressing a virtual key displayed on a display screen of the device,
(b) moving a cursor appearing on a display screen of the device to another location on the display screen,
(c) rotating a selection carousel, (d) switching between desktops,
(e) running a software application on the central processor unit,
(f) turning an application off,
(g) turning one or more speakers on or off,
(h) turning volume up or down,
(i) skipping to a next or previous track in a media player or between IPTV channels,
(j) controlling a GPS application,
(k) switching on a voicemail service,
(l) navigating within a photo/music album gallery,
(m) scrolling web-pages, emails, documents or maps,
(n) controlling actions in mobile games, or
(o) controlling interactive video or animated content.

29. A computer program configured to cause execution of the method of claim 14 by a processor, embodied on a non-transitory computer readable medium.

30. A non-transitory computer readable medium having instructions stored thereon that, when executed by a processor, cause the processor to:
after a partitioning of a plurality of video frames in the video stream into a plurality of regions of interest, perform, for each region of interest, an analysis of the pixels in the region of interest;
classify each of the regions of interest in each of the plurality of video frames based on the analysis and generate for each video frame, a region of interest (RI) frame that comprises one or more classifications of one or more of the regions of interest in the video frame, wherein the classification of a region of interest is a function that describes the probability of a presence of a tracked object in the region of interest; and
compare, by the processor, one or more classifications of regions of interest associated with one of the plurality of video frames with one or more classifications of regions of interest associated with one or more other video frames of the plurality of video frames to determine a motion of the tracked object, wherein both the one of the plurality of video frames and the one or more other video frames of the plurality of video frames correspond to a time window of the video stream.

* * * * *